US008892835B1

(12) United States Patent
Natanzon et al.

(10) Patent No.: US 8,892,835 B1
(45) Date of Patent: Nov. 18, 2014

(54) INSERTION OF A VIRTUALIZATION LAYER INTO A REPLICATION ENVIRONMENT

(75) Inventors: Assaf Natanzon, Tel Aviv (IL); Saar Cohen, Moshav (IL); Steven Bromling, Edmonton (CA)

(73) Assignees: EMC Corporation, Hopkinton, MA (US); EMC International Company, Hamilton (BM)

( * ) Notice: Subject to any disclaimer, the term of this patent is extended or adjusted under 35 U.S.C. 154(b) by 177 days.

(21) Appl. No.: 13/490,752

(22) Filed: Jun. 7, 2012

(51) Int. Cl.
*G06F 11/00* (2006.01)
*G06F 11/14* (2006.01)
*G06F 11/20* (2006.01)

(52) U.S. Cl.
CPC ........ *G06F 11/1471* (2013.01); *G06F 11/2058* (2013.01); *G06F 11/2074* (2013.01); *G06F 2201/84* (2013.01)
USPC .......................................... 711/162; 711/114

(58) Field of Classification Search
CPC ............ G06F 11/1471; G06F 11/1464; G06F 11/1458; G06F 11/1451; G06F 11/1456; G06F 11/1469; G06F 11/2071; G06F 2201/84; G06F 11/1466; G06F 2201/815; G06F 11/1435; G06F 3/065; G06F 11/2056; G06F 11/2082; G06F 11/2074; G06F 11/2058
USPC ................................................ 711/162, 114
See application file for complete search history.

(56) References Cited

U.S. PATENT DOCUMENTS

| 7,849,262 | B1 * | 12/2010 | Glade et al. ................... 711/114 |
| 8,335,771 | B1 * | 12/2012 | Natanzon et al. .............. 707/684 |
| 2008/0082770 | A1 * | 4/2008 | Ahal et al. ..................... 711/162 |
| 2009/0235046 | A1 * | 9/2009 | Asano et al. ................... 711/203 |
| 2009/0300307 | A1 * | 12/2009 | Carbone et al. ................ 711/163 |
| 2012/0166725 | A1 * | 6/2012 | Soran et al. .................... 711/114 |
| 2013/0191924 | A1 * | 7/2013 | Tedesco et al. ................. 726/26 |

* cited by examiner

*Primary Examiner* — Hashem Farrokh
(74) *Attorney, Agent, or Firm* — Daly, Crowley, Mofford & Durkee, LLP

(57) ABSTRACT

In one aspect, a method includes continuously replicating a physical volume with no disruption to the replicating while inserting a virtualization layer which virtualizes the physical volume with a virtual volume and replicating the virtual volume instead of the physical volume after the inserting. In another aspect, an article includes a non-transitory machine-readable medium that stores executable instructions. The instructions cause a machine to continuously replicate a physical volume with no disruption to the replicating while inserting a virtualization layer which virtualizes the physical volume with a virtual volume and replicate the virtual volume instead of the physical volume after the inserting. In a further aspect, an apparatus includes circuitry configured to continuously replicate a physical volume with no disruption to the replicating while inserting a virtualization layer which virtualizes the physical volume with a virtual volume and replicate the virtual volume instead of the physical volume after the inserting.

15 Claims, 5 Drawing Sheets

INSERTION OF A VIRTUALIZATION LAYER INTO A REPLICATION ENVIRONMENT

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes continuously replicating a physical volume with no disruption to the replicating while inserting a virtualization layer which virtualizes the physical volume with a virtual volume and replicating the virtual volume instead of the physical volume after the inserting.

In another aspect, an article includes a non-transitory machine-readable medium that stores executable instructions. The instructions cause a machine to continuously replicate a physical volume with no disruption to the replicating while inserting a virtualization layer which virtualizes the physical volume with a virtual volume and replicate the virtual volume instead of the physical volume after the inserting.

In a further aspect, an apparatus includes circuitry configured to continuously replicate a physical volume with no disruption to the replicating while inserting a virtualization layer which virtualizes the physical volume with a virtual volume and replicate the virtual volume instead of the physical volume after the inserting.

DETAILED DESCRIPTION

Described herein are techniques to allow for insertion of a virtualization layer to a production environment being replicated without disruption to replication activities. In one particular example, the replication environment is a network-based replication environment.

Generally, when adding a virtualization layer, the SCSI (Small Computer System Interface) identity of the volumes may change and a replication connection may need to be reconfigured. The replication performs a complete sweep of all the data since the volumes may be changed.

Figure 1:
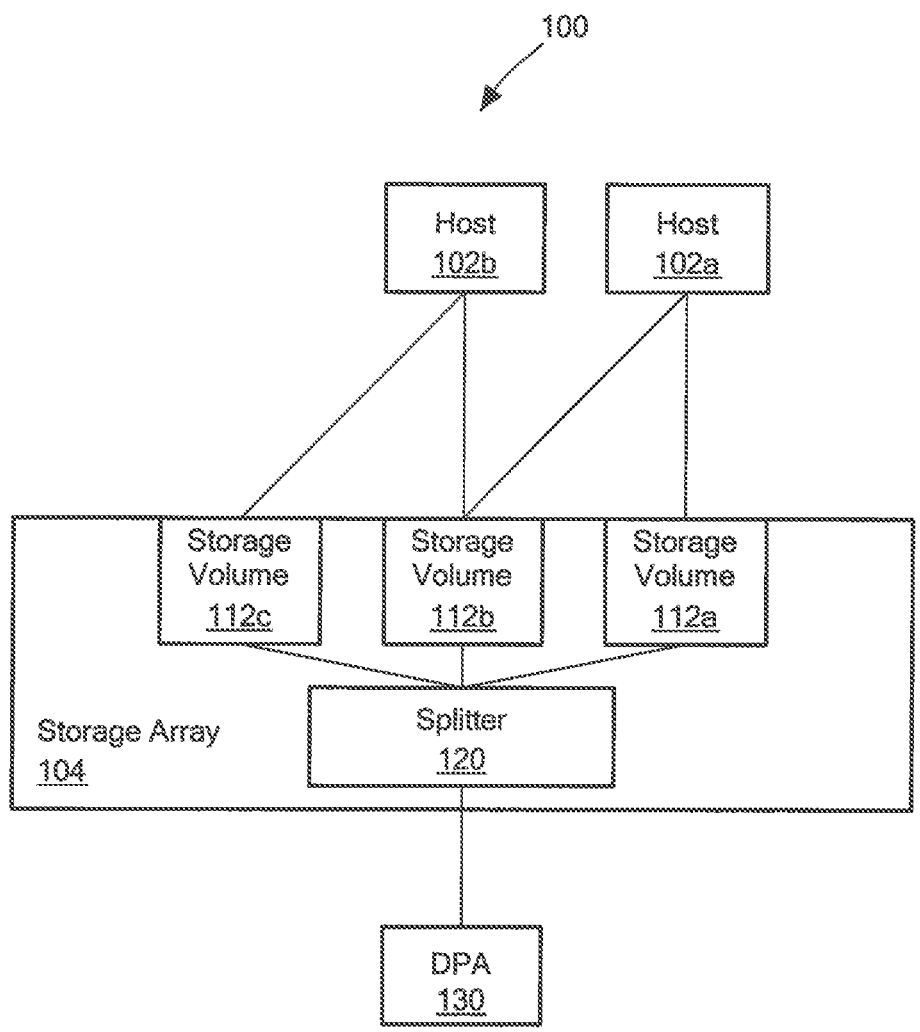
FIG. 1 is a block diagram of an example of a replication environment without a virtualization layer.

Referring to FIG. 1, a replication environment 100 includes hosts (a host 102a, a host 102b), a storage array 104 and a data protection appliance (DPA) 130. The storage array 130 includes storage volumes (e.g., a storage volume 112a, a storage volume 112b and a storage volume 112c) and a splitter 120. The host 102a stores data on storage volumes 112a, 112b and the host 102b stores data on storage volumes 112b, 112c. The splitter 120 sends I/Os written to the storage volumes 112a-112c to the DPA 130 to be replicated to a remote location located in another site (not shown) (or in other examples to the same storage array 104). In one particular example, the DPA 130 may send data to a remote DPA (not shown) which stores the data on a remote storage array (not shown).

Figure 2A:
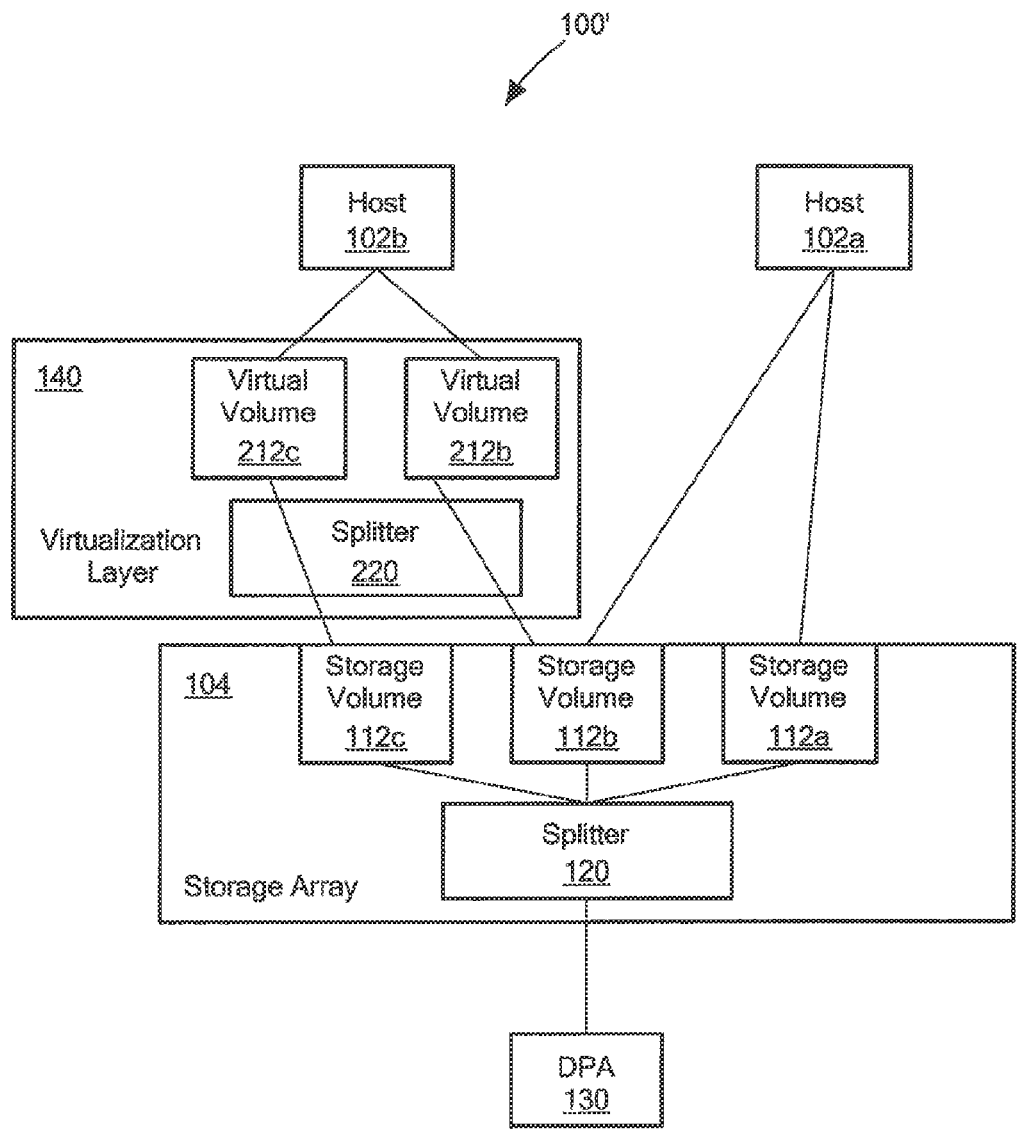
FIGS. 2A and 2B are block diagrams of replication environments that include a virtualization layer.

Referring to FIG. 2A, a replication environment 100' is similar to replication environment 100 but includes a virtualization layer 140. The virtualization layer 140 includes a splitter 220 and front end virtual volumes 212b, 212c. The virtualization layer 140 consumes storage volume 112b, 112c and exposes (i.e., makes accessible), for each storage volume 112b, 112c consumed, a front end virtual volume 212b, 212c, i.e. in this example there is one-to-one mapping between the original volumes and the virtualized volumes. As used herein, the term "consumes" means that the virtualization layer 140 is configured to see as an initiator, storage volumes 112b and 112c. The virtualization layer 140 generates new virtual volumes (which may have one-to-one mapping to the consumed volume as in the example described herein or the virtualization layer 140 may do some slicing and dicing, i.e. for example, consume two volumes, stripe them and expose three volumes and of the three volumes exposed, each is a slice of the striped volumes).

The front end virtual volumes 212b, 212c include the same data and each write and each read cache miss from the virtualization layer 140 is redirected to the original (physical back end) volume 112b or 112c. The SCSI identity of the front end virtual volume 212b, 212c may be the same or different than the original volumes 112b, 112c.

Figure 2B:
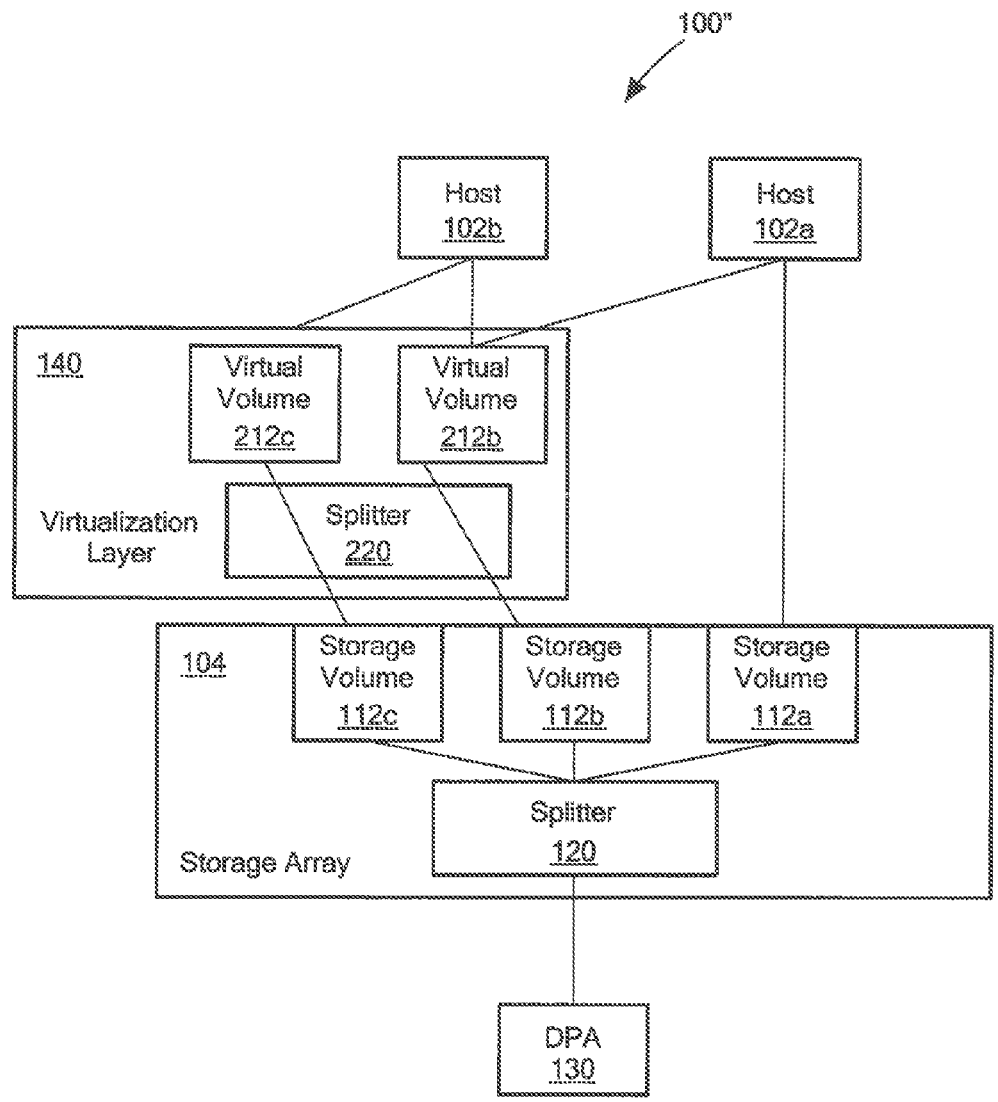

Referring to FIG. 2B, a replication environment 100" is similar to the replication environment 100' except the host 102a accesses the virtual volume 212b directly and does not access the volume 112b directly, i.e. both volumes 112b, 112c are exclusively used by the virtualization layer 140.

Figure 3:
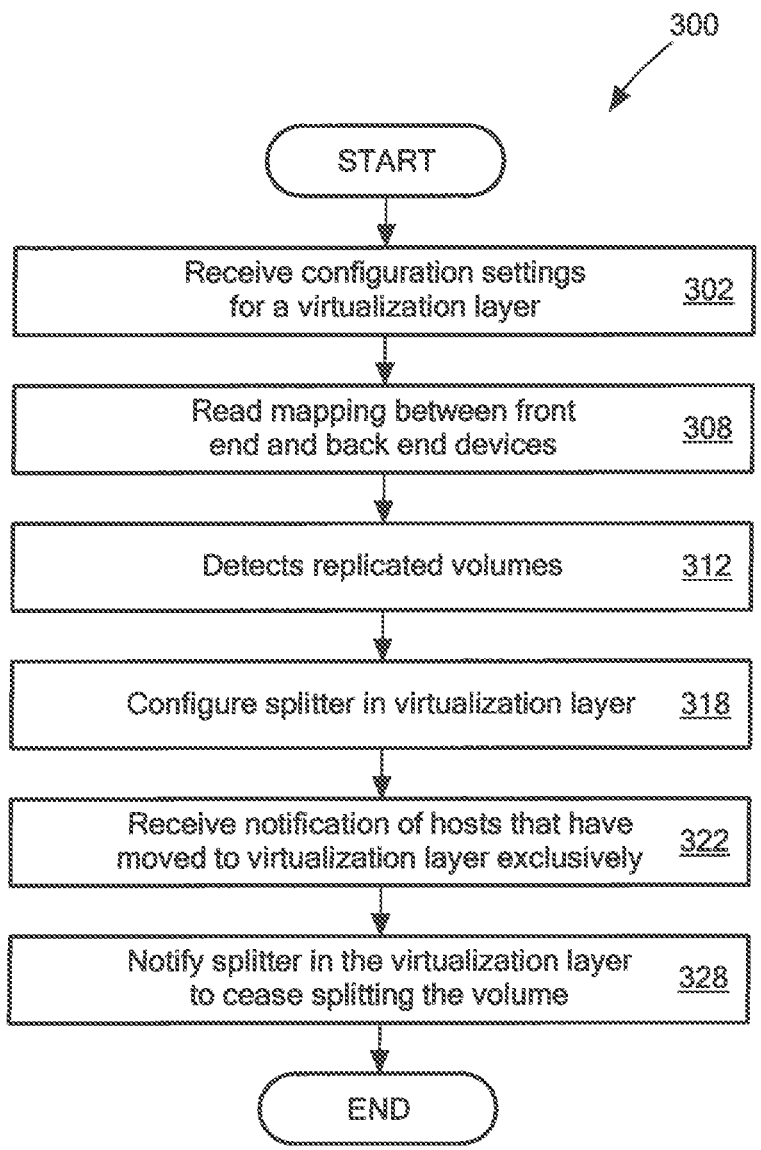
FIG. 3 is a flowchart of an example of a process to insert a virtualization layer in a replication environment.

Referring to FIG. 3, an example of a process to insert a virtualization layer into a storage environment within a replication environment is a process 300. For example, by adding a virtualization layer 140 in front of the host 102b in the replication environment 100 (FIG. 1), the replication environment 100 transitions to the replication environment 100' (FIG. 2A or 2B) without interruption to replication activities.

Process 300 receives configuration settings for a virtualization layer (302). For example, a user provides configuration settings for the virtualization layer 140 which is received by the DPA 130. In one particular example, the virtual volumes 212b, 212c are designated to be virtual volumes of the volumes 112b, 112c, respectively, used by the host 102b (FIGS. 2A and 2B) and host 102a (FIG. 2B). For example, applications on the host 102b that use volumes 112b, 112c will stop using (e.g., stop writing I/Os) the volumes 112b, 112c directly, but will rather write I/Os directly to volumes 212b, 212c respectively.

Once the system is virtualized, the virtualization layer 140 may, for example, seamlessly migrate storage volumes 112b, 112c to another storage device without the host 102b, for instance, knowing the data has moved. For this possibility, it is important that the replication will be a replication of the virtual volumes (virtual volumes 212b, 212c) rather than the physical volumes (e.g., storage volumes 112b, 112c). The reason is that after such a migration if the replication is at the virtualization layer 140, the physical volume will no longer be replicated.

Process 300 reads the mapping between the frontend devices (virtual volumes 212b, 212c) and backend devices (storage volumes 112b, 112c) (308) and detects replicated volumes (312). For example, the DPA 130 reads the mapping between the front end virtual volumes 212b, 212c and back end storage volumes 112b, 112c and detects that storage volumes 112b, 112c are replicated by DPA 130 (since the DPA 130 is configured to replicate storage volumes 112b, 112c).

In particular, the DPA 130 is configured to receive I/Os associated with the front end virtual volume 212b, 212c from the splitter 220 and the I/Os associated with the volumes 112a, 112b from the splitter 120. The DPA 130 may receive each I/O for a virtualized volume twice: once from the splitter 220 in the virtualization layer 140 and once from a splitter to the original volume (either at the host (e.g., a host splitter (not shown)) or at the storage array 104 as shown by the splitter 120 in FIGS. 2A and 2B.

Process 300 configures the splitter in the virtualization layer (318). For example, the DPA 130 configures splitter 220 in virtualization layer 140 to split I/Os to the DPA 130 and generate an identity between I/Os arriving from the storage-array-based splitter 120 (or other splitter) to the original volume and I/Os arriving from the virtualization layer 140. At this point, the system 100', 100" may be configured in a way that for one target volume there may have two different sources (since the virtual identity of the volume may be different): one source is the original physical source and the other source is the virtualized source of the replication.

It is important to continue accepting I/Os from both splitters as long as there are hosts using the volumes directly from the original storage. For example, in FIG. 2A, the host 102a may still use storage volume 112a directly; and thus, splitting I/Os from the splitter 220 will not capture all the I/Os arriving at the storage volume 112a.

In some examples, the migration to the virtualization layer 140 may be atomic i.e., all the hosts move to use a virtualized volume at the same time. While in other examples the transfer may be gradual and each host may move at its own time (in this case the virtualization layer 140 may use no caching until all hosts are transferred).

The replication migration process described herein is independent of the migration to the virtualization layer, in a sense that the replication migration process may happen after of the migration to use the virtual storage completed or during the migration process.

Process 300 receives notification of hosts that have moved to the virtualization layer 140 exclusively (322) for specific volumes. For example, a user notifies the DPA 130 that hosts (host 102b, 102a) have moved to use the virtualization layer 140 exclusively for storage volumes 112b, 112c and do not directly use the back end storage volumes 112b, 112c. In another example, the DPA 130 detects that the host have moved to the virtualization layer 140 exclusively by reading the configuration of the splitter 120 and determining that the back end storage volumes 112b, 112c are no longer exposed to any host other than the virtualization layer 140.

Process 300 notifies the splitter in the virtualization layer to cease splitting I/Os for the volume with no hosts directly accessing the volume (328). For example, the DPA 130 notifies the splitter 220 in the virtualization layer 140 to cease splitting I/Os to the volume 112c which is now being replicated by the virtualization layer 140. However, I/Os still need to be split for volume 112b by the splitter 120 in FIG. 2A since the host 102a still directly accesses the volume 112b. In FIG. 2B, since the hosts 102a, 102b using the volumes 112b, 112c are going through the virtualization layer 140, the splitter 120 is disable for volumes 112b, 112c after the hosts 102a, 102b are configured to exclusively use the virtualization layer 140.

In one example, the DPA 130 also identifies identical I/Os arriving from both splitters 120, 220 and replicates only one of them to the replication site.

Figure 4:
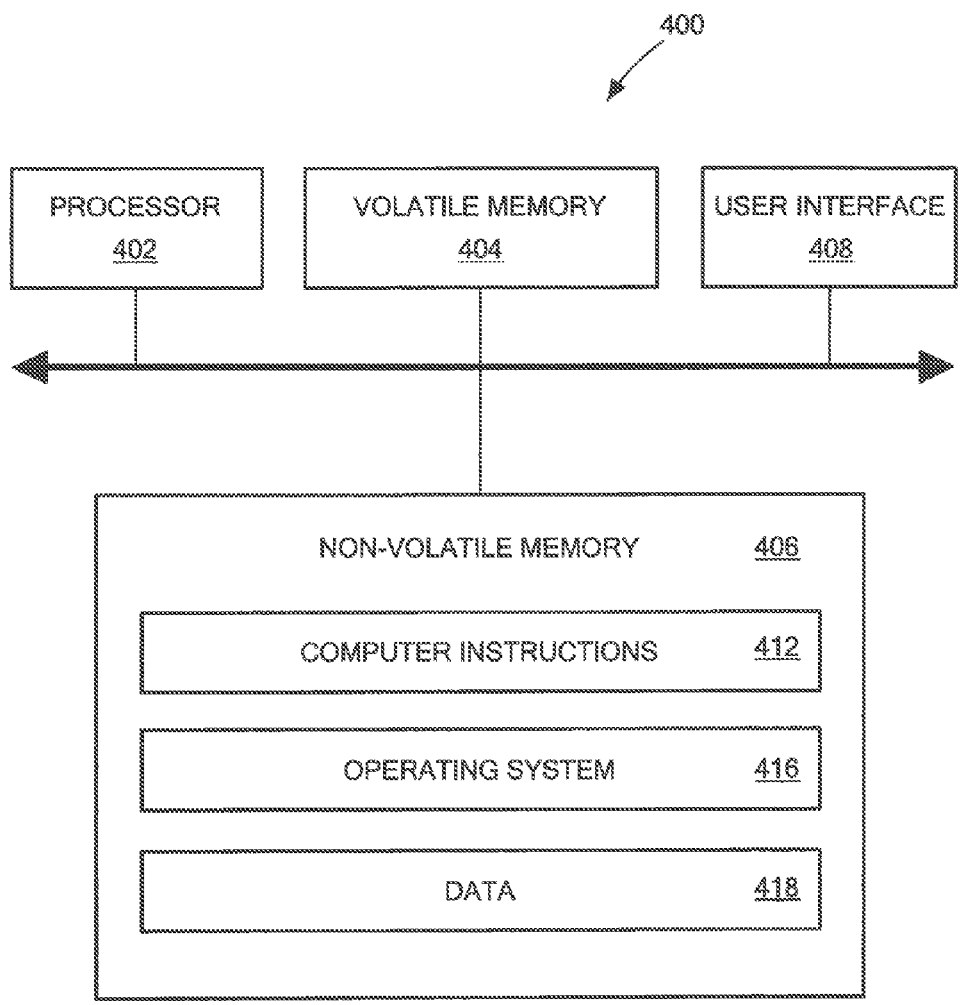
FIG. 4 is a computer on which the process of FIG. 3 may be implemented.

Referring to FIG. 4, an example of a computer used to insert a virtualization engine is a computer 400. The computer 400 includes a processor 402, a volatile memory 404, a non-volatile memory 406 (e.g., hard disk) and a user interface (UI) 408 (e.g., a mouse, a keyboard, a display, touch screen and so forth). The non-volatile memory 406 stores computer instructions 412, an operating system 416 and data 418. In one example, the computer instructions 412 are executed by the processor 402 out of volatile memory 404 to perform all or part of the processes described herein (e.g., process 300).

The processes described herein (e.g., process 300) are not limited to use with the hardware and software of FIG. 4; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein. The processes described herein may also be implemented as a machine-readable storage medium, configured with a computer program, where upon execution, instructions in the computer program cause the computer to operate in accordance with the processes.

The processes described herein are not limited to the specific examples described. For example, the process 300 is not limited to the specific processing order of FIG. 3. Rather, any of the processing blocks of FIG. 3 may be re-ordered, combined or removed, performed in parallel or in serial, as necessary, to achieve the results set forth above.

The processing blocks (for example, in process 300) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method, comprising:
    continuously replicating a physical volume with no disruption to the replicating while inserting a virtualization layer which virtualizes the physical volume with a virtual volume; and
    replicating the virtual volume instead of the physical volume after the inserting;
    configuring a splitter at the virtualization layer to split I/Os to a data protection appliance (DPA) for a replicated volume; and
    configuring the DPA to determine I/Os arriving from the virtual volume and I/Os arriving from the physical volume are identical and replicate the identical I/Os to the same target volume.

2. The method of claim 1, further comprising exposing the virtual volume with a different SCSI (Small Computer System Interface) identity than the physical volume.

3. The method of claim 1, further comprising exposing the virtual volume with an identical SCSI (Small Computer System Interface) identity as the physical volume.

4. The method of claim 1, further comprising detecting that the virtualized volume is being replicated.

5. A method, comprising:
    continuously replicating a physical volume with no disruption to the replicating while inserting a virtualization layer which virtualizes the physical volume with a virtual volume; and
    replicating the virtual volume instead of the physical volume after the inserting;
    configuring a splitter at the virtualization layer to split I/Os to a data protection appliance (DPA) for a replicated volume; and
    identifying that all hosts accessing the physical volume are no longer directly accessing the physical volume and are accessing the virtual volume through the virtualization layer.

6. The method of claim 5, further comprising ceasing splitting I/Os of the physical volume and only replicating I/Os from the virtualized volume.

7. An article comprising:
    a non-transitory machine-readable medium that stores executable instructions, the instructions causing a machine to:
        continuously replicate a physical volume with no disruption to the replicating while inserting a virtualization layer which virtualizes the physical volume with a virtual volume;
        replicate the virtual volume instead of the physical volume after the inserting;
        configure a splitter at the virtualization layer to split I/Os to a data protection appliance (DPA) for a replicated volume;
        determine I/Os arriving from the virtual volume and I/Os arriving from the physical volume are identical and replicate the identical I/Os to the same target volume;
        identify that all hosts accessing the physical volume are no longer directly accessing the physical volume and are accessing the virtual volume through the virtualization layer; and
        cease splitting I/Os of the physical volume and only replicating I/Os from the virtualized volume.

8. The article of claim 7, further comprising instructions causing the machine to expose the virtual volume with a different SCSI (Small Computer System Interface) identity than the physical volume.

9. The article of claim 7, further comprising instructions causing the machine to expose the virtual volume with an identical SCSI (Small Computer System Interface) identity as the physical volume.

10. The article of claim 7, further comprising instructions causing the machine to detect that the virtualized volume is being replicated.

11. An apparatus, comprising:
    circuitry configured to:
        continuously replicate a physical volume with no disruption to the replicating while inserting a virtualization layer which virtualizes the physical volume with a virtual volume;
        replicate the virtual volume instead of the physical volume after the inserting;
        configure a splitter at the virtualization layer to split I/Os to a data protection appliance (DPA) for a replicated volume;
        determine I/Os arriving from the virtual volume and I/Os arriving from the physical volume are identical and replicate the identical I/Os to the same target volume;
        identify that all hosts accessing the physical volume are no longer directly accessing the physical volume and are accessing the virtual volume through the virtualization layer; and
        cease splitting I/Os of the physical volume and only replicating I/Os from the virtualized volume.

12. The apparatus of claim 11 wherein the circuitry comprises at least one of a processor, a memory, programmable logic and logic gates.

13. The apparatus of claim 11, further comprising circuitry to expose the virtual volume with a different SCSI (Small Computer System Interface) identity than the physical volume.

14. The apparatus of claim 11, further comprising circuitry to expose the virtual volume with an identical SCSI (Small Computer System Interface) identity as the physical volume.

15. The apparatus of claim 11, further comprising circuitry to detect that the virtualized volume is being replicated.

* * * * *